US010344829B2

(12) United States Patent
Knoblauch et al.

(10) Patent No.: US 10,344,829 B2
(45) Date of Patent: Jul. 9, 2019

(54) ELECTRIC AXLE DRIVE FOR A MOTOR VEHICLE

(71) Applicant: Dr. Ing. h.c. F. Porsche Aktiengesellschaft, Stuttgart (DE)

(72) Inventors: Daniel Knoblauch, Ludwigsburg (DE); Gary Avery, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 115 days.

(21) Appl. No.: 15/559,529

(22) PCT Filed: Dec. 8, 2015

(86) PCT No.: PCT/DE2015/100521
§ 371 (c)(1),
(2) Date: Sep. 19, 2017

(87) PCT Pub. No.: WO2016/150411
PCT Pub. Date: Sep. 29, 2016

(65) Prior Publication Data
US 2018/0119779 A1    May 3, 2018

(30) Foreign Application Priority Data
Mar. 20, 2015  (DE) .................. 10 2015 003 519

(51) Int. Cl.
*F16H 3/58*       (2006.01)
*B60K 1/00*       (2006.01)
*B60K 1/02*       (2006.01)

(52) U.S. Cl.
CPC ................ *F16H 3/58* (2013.01); *B60K 1/00* (2013.01); *B60K 1/02* (2013.01);
(Continued)

(58) Field of Classification Search
None
See application file for complete search history.

(56) References Cited

U.S. PATENT DOCUMENTS 3,603,176 A * 9/1971 Tipping ................. F16H 47/04
475/23
4,627,513 A * 12/1986 Tutzer .................. B60K 17/346
180/233
(Continued)

FOREIGN PATENT DOCUMENTS

DE    102012204281 A1    9/2013
DE    1020133102161 A1   9/2014
(Continued)

OTHER PUBLICATIONS

International Search Report and Written Opinion for International Application No. PCT/DE2015/100521, dated May 23, 2016—9 Pages.
(Continued)

*Primary Examiner* — Justin Holmes
(74) *Attorney, Agent, or Firm* — RatnerPrestia

(57) ABSTRACT

An electric axle drive has a transmission arrangement with two gears, with an electric machine for driving two output shafts of the axle of the motor vehicle, a first spur gear stage which can be driven by the electric machine for driving an intermediate shaft and a planetary carrier of a planetary gear mechanism, which planetary carrier is connected fixedly to the intermediate shaft and receives planetary gears, and with an internal gear of the planetary gear mechanism for driving a second spur gear stage, a sun gear of the planetary gear mechanism and shifting elements for shifting the two gears. A first shifting element is configured as a clutch, by way of which the internal gear and the sun gear or the internal gear and the planetary carrier or the sun gear and the planetary carrier can be connected in a torque-transmitting manner.

17 Claims, 5 Drawing Sheets

(52) U.S. Cl.
CPC .......... *B60K 2001/001* (2013.01); *F16H 2200/0021* (2013.01); *F16H 2200/0034* (2013.01); *F16H 2200/2005* (2013.01); *F16H 2200/2035* (2013.01); *F16H 2200/2066* (2013.01); *F16H 2200/2082* (2013.01)

(56) References Cited

U.S. PATENT DOCUMENTS

| | | | |
|---|---|---|---|
| 5,387,161 | A | 2/1995 | Shibahata |
| 8,672,790 | B2 | 3/2014 | Severinsson et al. |
| 9,102,233 | B2 | 8/2015 | Knoblauch et al. |
| 9,140,335 | B2 | 9/2015 | Knoblauch |
| 9,156,345 | B2 | 10/2015 | Serrarens et al. |
| 2009/0093333 | A1* | 4/2009 | Adams, III ............ F16H 48/08 475/88 |
| 2009/0192006 | A1* | 7/2009 | Bock ............ F16H 48/08 475/205 |
| 2010/0240485 | A1* | 9/2010 | Strasser ............ B60K 6/387 475/150 |
| 2010/0285917 | A1* | 11/2010 | Rahm ............ F16H 48/08 475/220 |
| 2011/0207570 | A1* | 8/2011 | Tanaka ............ B60K 1/00 475/150 |
| 2014/0256493 | A1* | 9/2014 | Knoblauch ............ B60K 7/0007 475/151 |

FOREIGN PATENT DOCUMENTS

| | | |
|---|---|---|
| JP | H04321435 A | 11/1992 |
| JP | H08502118 A | 3/1996 |
| JP | 2009113519 A | 5/2009 |
| JP | 2012519809 A | 8/2012 |
| JP | 2014194280 A | 10/2014 |
| KR | 20140126710 A | 10/2014 |
| WO | 2006074679 A1 | 7/2006 |

OTHER PUBLICATIONS

Notification of Reason for Rejection for Japanese Application No. 2017-549189, dated Aug. 14, 2018, 5 pages.
Notice of Preliminary Rejection for Korean Application No. 10-2017-7029961, dated Oct. 18, 2018, 5 pages.
Chinese Office Action for Chinese Application No. 2015800780415, dated Jan. 28, 2019, 6 pages.

* cited by examiner

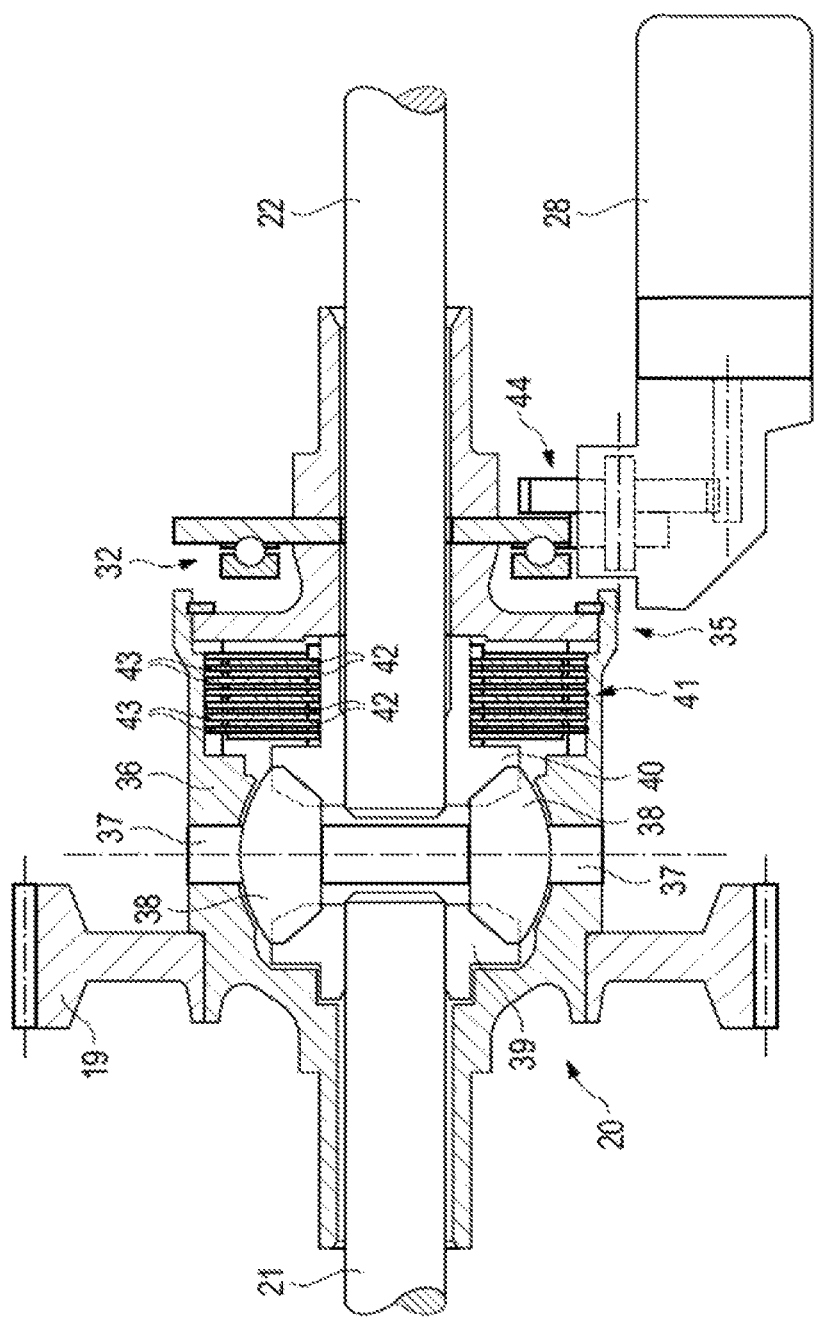

ELECTRIC AXLE DRIVE FOR A MOTOR VEHICLE

CROSS-REFERENCE TO RELATED APPLICATIONS

This U.S. national phase patent application claims priority to PCT International Patent Application No. PCT/DE2015/100521, filed Dec. 8, 2015, which claims priority to German Patent Application No. DE 10 2015 003 519.3, filed Mar. 20, 2015, the content of each application being incorporated by reference herein in its entirety.

FIELD OF THE INVENTION

The invention relates to an electric axle drive for a motor vehicle, comprising an electric machine for driving two output shafts of the axle of the motor vehicle, and comprising two spur gear stages and a planetary gear mechanism, wherein the electric axle drive has two gears and the planetary gear mechanism is shifted as a block in one of the gears and the transmission ratio in the planetary gear mechanism is shifted in the other of the gears.

BACKGROUND OF THE INVENTION

Such an electric axle drive for a motor vehicle is known from DE 10 2013 102 161 A1. In this axial drive, a first spur gear stage is provided on the electric machine side, wherein an intermediate shaft is connected as an output of this spur gear stage to a planetary carrier of the planetary gear mechanism. A ring gear of the planetary gear mechanism is connected to one spur gear of the second spur gear stage, the other spur gear thereof serving, via a differential gear mechanism, to drive two output shafts of the axle of the motor vehicle. Each output shaft is assigned a wheel, that is to say a road wheel, of this axle. The planetary gear mechanism is assigned shifting means which allow shifting under load and require that, in particular in a first gear of the motor vehicle, which is a primary gear, the transmission ratio in the planetary gear mechanism is shifted. By contrast, in the second gear, which is consequently the secondary gear, the planetary gear mechanism is shifted as a block, that is to say revolves as a block and does not lie in the power flow.

SUMMARY OF THE INVENTION

It is the object of the present invention to specify an alternative arrangement of two spur gear stages and a planetary gear mechanism in an electric axle drive of a motor vehicle, with optimum efficiency of the torque transmission.

In the electric axle drive according to the invention for a motor vehicle, the transmission arrangement thus has two gears. The axial drive has an electric machine for driving two output shafts of the motor vehicle, and furthermore a first spur gear stage which can be driven by means of the electric machine and intended for driving an intermediate shaft and a planetary carrier of a planetary gear mechanism, which planetary carrier is fixedly connected to the intermediate shaft and receives planetary gears. The planetary gear mechanism further has a ring gear and a sun gear. In the axial drive, the ring gear serves for driving a second spur gear stage.

The electric axle drive according to the invention further has shifting elements for shifting the two gears. Here, a first shifting element is designed as a clutch, by means of which the ring gear and the sun gear or the ring gear and the planetary carrier or the sun gear and the planetary carrier can be connected in a torque-transmitting manner. The sun gear and a transmission housing of the transmission arrangement can be connected to one another in a rotationally fixed manner by means of a second shifting element.

Furthermore, in the electric axle drive according to the invention, an output of the second spur gear stage is connected in a torque-transmitting manner to a differential gear mechanism. Here, the two output shafts of the axle of the motor vehicle are assigned in the output of the differential gear mechanism. The differential gear mechanism is connected to a torque-vectoring unit and/or a transverse lock. A differential torque between the two drive shafts can be generated by means of the torque-vectoring unit. The transverse lock, which can be controlled in particular electronically, makes it possible to prevent a situation in which a wheel of the axle of the motor vehicle having relatively poor road grip spins and the other wheel no longer obtains any drive torque.

There is provision in particular that the clutch is opened in a first shifting stage and closed in a second shifting stage, and the second shifting element effects the immobilization with respect to a transmission housing in the first shifting stage and the immobilization is canceled in the second shifting stage.

The second shifting element can be configured in a variety of ways in order to fulfill the aim according to the invention. In particular, the second shifting element is designed as a freewheel and/or as a clutch, in particular as a claw clutch, and/or as a brake.

In the first shifting stage, which is in particular the first gear of the motor vehicle, the sun gear is stationary with the result that the torque flow takes place from the first spur gear stage via the planetary carrier and the ring gear to the second spur gear stage. In the second shifting stage, which is in particular the second gear of the motor vehicle, the sun gear rotates and the shiftable planetary gear mechanism revolves as a block in this gear. In both shifting stages, the two spur gear stages are thus in the power flow and in movement. Since the electric axle drive can be operated in two gears, it is possible for the vehicle to be driven purely electrically over a wide speed range.

The clutch preferably connects the planetary carrier and the ring gear to one another in a rotationally fixed manner in the closed position.

According to a structurally particularly advantageous configuration, there is provision that the clutch is frictionally active.

The planetary gear set of this planetary gear mechanism can be configured differently. The planetary gear set preferably has double planets. Thus, first and second planetary gears are mounted in the planetary carrier, wherein the first planetary gears mesh only with the ring gear and the second planetary gears, and the second planetary gears mesh only with the sun gear and the first planetary gears.

In the electric axle drive, the freewheel is preferably provided for traction operation of the motor vehicle. In order to make it possible for the electric axle drive also to be connected in overrun operation, a further clutch is preferably provided. This further clutch can replace the freewheel in principle, and thus be provided for traction operation and overrun operation corresponding to the shifting of the clutch.

There is preferably provision that, in the first shifting stage, the second shifting element designed as a further clutch is closed for immobilizing the sun gear with respect to a housing of the planetary gear mechanism and/or the second shifting element designed as a freewheel immobilizes the sun gear with respect to the housing of the planetary gear mechanism. Furthermore, there is preferably provision that, in the second shifting stage, the second shifting element designed as a further clutch is opened for immobilizing the sun gear with respect to the housing of the planetary gear mechanism and/or the second shifting element designed as a freewheel releases the sun gear with respect to the housing. Here, the term "further clutch" is to be understood in very broad terms. In the broadest sense, it is also a brake which makes it possible to brake or in this respect immobilize the rotating part with respect to the housing.

In principle, when using a freewheel, the latter is able to be combinable with the further clutch, in particular a claw clutch for recuperation.

From a structural aspect, in particular a structurally extremely compact configuration with favorable torque transmission, it is considered to be particularly advantageous if a first spur gear of the second spur gear stage is arranged coaxially to the intermediate shaft. It is particularly advantageous if the planetary gear mechanism is arranged co-axially to the intermediate shaft. Furthermore, it is considered to be advantageous if the axes of the two spur gear stages and a center axis of the at least one output shaft are also arranged axially parallel to one another.

The planetary gear mechanism is preferably shifted by means of a single actuator. When using a freewheel instead of the further clutch, this can be achieved in a simple manner.

The differential gear mechanism is preferably designed as a bevel-gear differential or as a planetary differential. When using a planetary differential, this is designed in particular with a Ravigneaux-type gear set. The design as a bevel gear differential is preferred in particular when designing the axial drive with a transverse lock.

In particular, the torque-vectoring unit provided in the electric drive has at least one further electric machine and at least one superposition gear mechanism, in order to generate a differential torque between the two output shafts. This torque-vectoring unit preferably consists of the stated further electric machine, a superposition gear mechanism and a planetary gear set or transmission-ratio-forming toothing stages.

The differential gear mechanism and/or the torque vectoring unit or the transverse lock are preferably each arranged inside or outside the transmission housing of the transmission arrangement.

The locking differential can be activated in various ways. Thus, an electromotive actuation is possible, in particular in a known manner by means of actuating motor, gear mechanism and ball ramp. Another variant comprises actuating the transverse lock electrohydraulically, in particular by means of actuating motor, pump (which can be embodied with or without pressure accumulator), valves and actuating pistons.

The electric axle drive according to the present invention and its developments thus has a two-gear transmission which takes the form of a two- to three-stage transmission, in particular a three-shaft transmission. The differential gear mechanism is preferably designed as a spur gear differential or bevel gear differential. The final drive is embodied with a spur gear design. The shifting actuator system is preferably formed by only one actuator.

The invention including its developments thus proposes an electric, power-shift two-gear axial drive with torque vectoring unit and/or transverse lock.

Further features of the invention will emerge from the subclaims, the appended drawing and the description of the exemplary embodiments reproduced in the drawing, without being limited thereto.

BRIEF DESCRIPTION OF THE DRAWINGS

The invention is best understood from the following detailed description when read in connection with the accompanying drawings. Included in the drawing are the following figures:

FIG. 5 shows a section through a differential, designed as a locking differential, for use in the axial drive.

DETAILED DESCRIPTION

The electric axle drive is used in particular in a passenger car. Two wheels/road wheels of an axle of the motor vehicle are driven by means of the electric axle drive.

Figure 1:
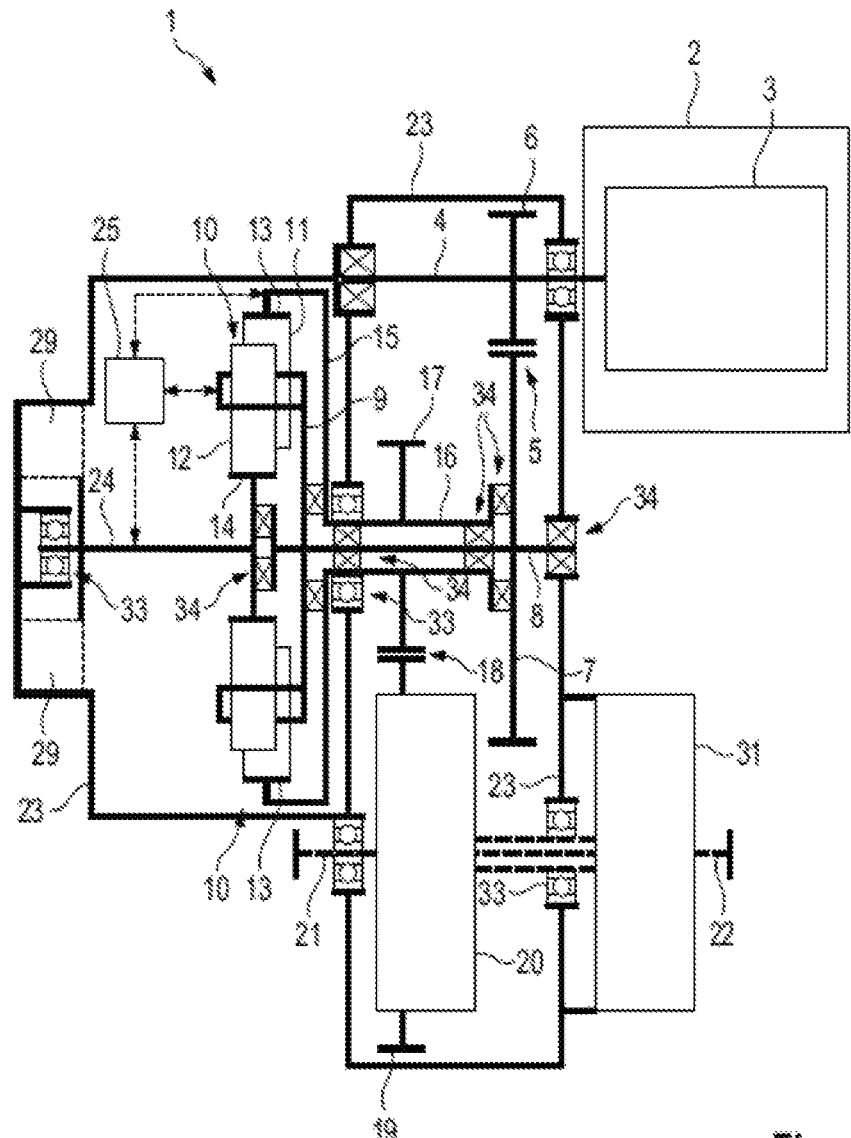
FIG. 1 shows, in a schematic representation, a basic arrangement of the drive components of the electric axle drive.

FIG. 1 illustrates the basic structure of the electric axle drive 1. There is illustrated an electric machine 2—traction electric machine—with its rotor 3 and, connected thereto, an output shaft 4. Interacting with the latter is a spur gear stage 5. Specifically, a spur gear 6 of the spur gear stage 5 is connected in a rotationally fixed manner to the output shaft 4, wherein this spur gear 6 has a relatively small diameter. A spur gear 7 of this spur gear stage 5 meshes with this spur gear 6, wherein the spur gear 7 has a relatively large diameter.

The spur gear 7 is connected in a rotationally fixed manner to an intermediate shaft 8. This intermediate shaft 8 is connected in a rotationally fixed manner to a planetary carrier 9 of a planetary gear mechanism 10. The planetary carrier 9 receives double planets. Accordingly, first planetary gears 11 and second planetary gears 12 are mounted rotatably at the planetary carrier 9. The first planetary gears 11 mesh exclusively with a ring gear 13 of the planetary gear mechanism 10, and the second planetary gears 12 mesh exclusively with a sun gear 14 of the planetary gear mechanism 10.

The ring gear 13 forms a constituent part of a bell 5 which is connected radially internally in a rotationally fixed manner to a hollow shaft 16 which is arranged co-axially to the intermediate shaft 8. The hollow shaft 16 is fixedly connected to a spur gear 17 of a second spur gear stage 18. This spur gear 17 has a relatively small diameter and meshes with a spur gear 19 of the second spur gear stage 18 that has a relatively large diameter. This spur gear 19 serves for directly driving a differential gear mechanism 20, which is in particular a planetary differential. Outputs of this differential gear mechanism 20 are assigned to output shafts 21, 22 of the axle of the motor vehicle. The axis of rotation of the spur gear 19 or a center axis of the differential gear mechanism 20 also constitutes the axis of rotation of the two output shafts 21, 22 of the electric axle drive 1. Here, the respective output shaft 21 or 22 serves for driving a (road) wheel of the axle of the motor vehicle. The output shafts 21, 22 are thus output shafts of the electric axle drive or output shafts of the transmission unit for driving the respective wheel/road wheel of the passenger car in the region of the vehicle axle.

The transmission housing is designated by the reference number 23.

In the text which follows, the components for shifting the planetary gear mechanism 10 are illustrated in two shifting stages:

The sun gear 14 is mounted in a shaft 24 arranged co-axially to the intermediate shaft 8 and is fixedly connected to said shaft. In order to connect two of the three components of the planetary gear mechanism 10—planetary carrier 9, ring gear 13, sun gear 14—in a rotationally fixed manner, there is provided a first shifting element 25 designed as a clutch.

Furthermore, the shaft 24 is connected to the transmission housing 23 via a second shifting element designed as a freewheel 29. This freewheel 29 is active during traction operation in one gear of the electric axle drive.

In the first shifting stage, the ring gear 13 or the planetary carrier 9 and the sun gear 14 are not coupled to one another, whereby no torque is transmitted via the clutch 25. In this first shifting stage, the freewheel 29 immobilizes the sun gear 14 with respect to the transmission housing 23. By contrast, in the second shifting stage, the ring gear 13 or the planetary carrier 9 and the sun gear 14 are coupled to one another, whereby torque is transmitted via the clutch 25. In this second shifting stage, the freewheel 29 releases the sun gear 14 with respect to the transmission housing 23.

In the first shifting stage, in the present case the first gear, the clutch 25 is opened and the freewheel 29 blocks the sun gear 14. In the second shifting stage, that is to say in the second gear, this clutch 25 is closed, whereby the planetary gear mechanism 10 revolves as a whole. In this gear stage, the freewheel 29 is overtaken on account of the rotation of the components assigned to the drive train.

The electric axle drive 1 has various ball bearings 33 and needle bearings 34.

The electric axle drive is provided with a torque vectoring unit 31. This is flanged onto the transmission housing 23 and interacts with the output of the differential gear mechanism 20. The torque-vectoring unit 31 preferably consists of a superposition gear mechanism, a planetary gear set or a transmission-ratio-forming toothing stage/transmission-ratio-forming toothing stages and an electric machine, that is to say an electric machine which is additional with respect to the electric machine 2. The torque-vectoring unit 31 can by all means also be arranged inside the transmission housing 23.

Figure 2:
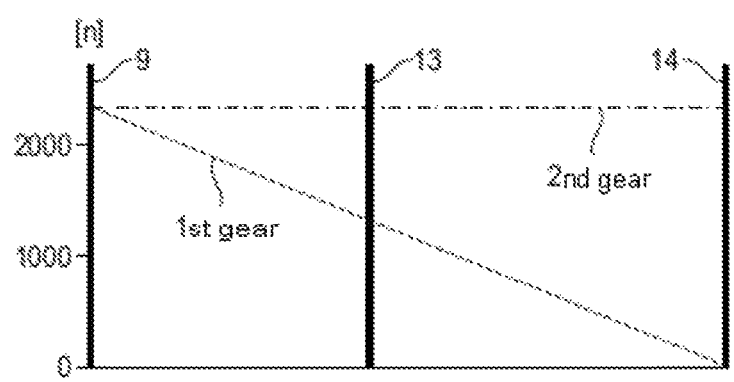
FIG. 2 shows a nomogram for illustrating the rotational speeds of components of the arrangement according to FIG. 1.

FIG. 2 shows in a nomogram the rotational speeds of planetary gear 9, ring gear 13 and sun gear 14 in the first and second gear of the motor vehicle. This also applies to the embodiments according to FIGS. 3 and 4.

Figure 3:
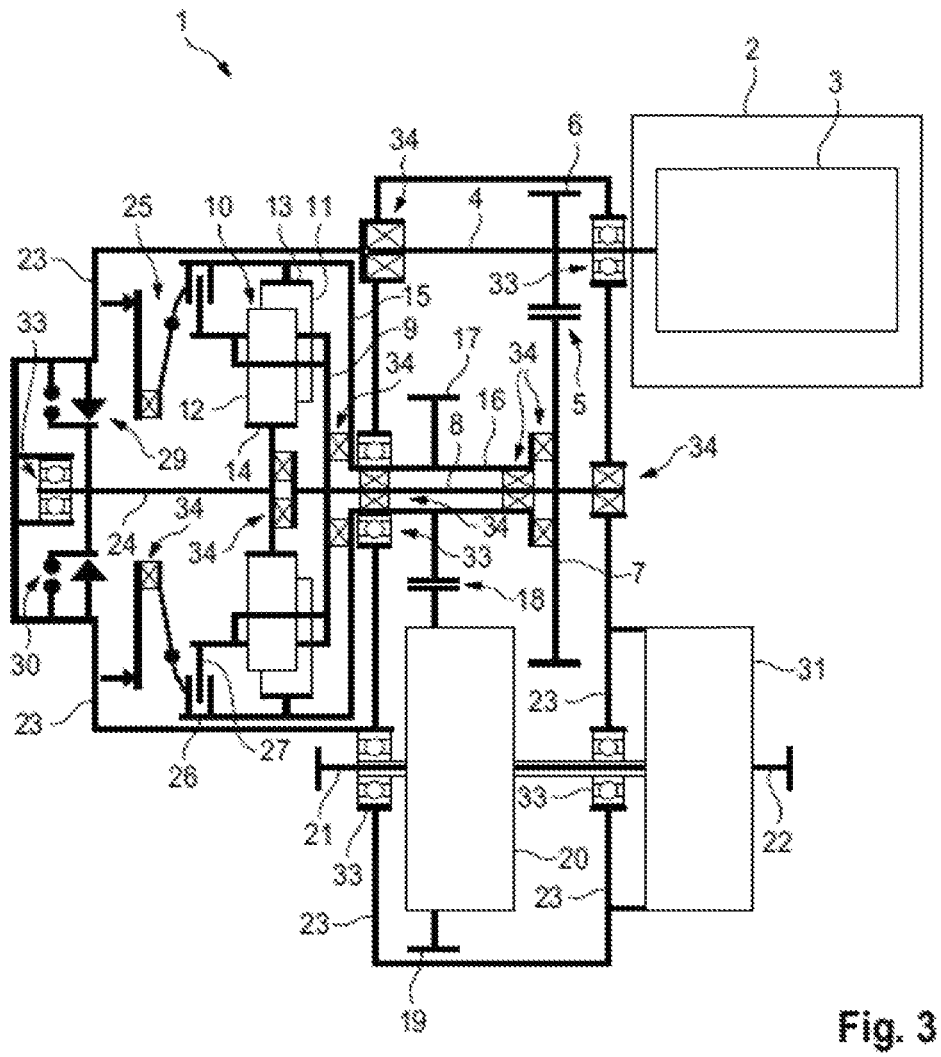
FIG. 3 shows, for a preferred exemplary embodiment, a schematic representation of the drive components of the electric axle drive.

FIG. 3 shows a preferred exemplary embodiment of the electric axle drive. For the sake of simplicity, parts which correspond with the basic arrangement according to FIG. 1 are designated with the same reference numbers. Moreover, this also applies to the further exemplary embodiment explained below.

In the exemplary embodiment according to FIG. 3, the first shifting element 25 is designed as a clutch which, in its closed position, connects the planetary carrier 9 to the ring gear 13 in a torque-transmitting manner. Furthermore, the second shifting element 29 is designed as a freewheel. Furthermore, a further clutch 30, which is designed as a claw clutch is provided. Consequently, the shaft 24 is connected to the transmission housing 23 via the second shifting element (i.e., the freewheel 29 and the further clutch or the claw clutch 30). The freewheel 29 is active during traction operation in one gear of the electric axle drive.

In the first shifting stage, the planetary carrier 9 and the ring gear 13 are not coupled to one another, whereby no torque is transmitted via the clutch 25. In this first shifting stage, the freewheel 29 immobilizes the sun gear 14 with respect to the transmission housing 23. By contrast, in the second shifting stage, the planetary carrier 9 has the ring gear 13 are coupled to one another, whereby torque is transmitted via the clutch 25. In this second shifting stage, the free wheel 29 releases the sun gear 14 with respect to the transmission housing 23.

In the first shifting stage, in the present case the first gear, the clutch 25 for coupling planetary carrier 9 and ring gear 13 is opened by separating its clutch parts 26, 27 which are connected to the ring gear 13 or the planet carrier 9, and the freewheel 29 blocks the sun gear. In the second shifting stage, that is to say the second gear, this clutch 25 is closed, whereby the planetary gear mechanism 10 revolves as a whole. In this gear stage, the freewheel 29 is overtaken on account of the rotation of the components assigned to the drive train.

In recuperation operation, that is to say if torque is introduced via the output shafts 21, 22 into the differential gear mechanism 20, the claw clutch 30 is shifted into its closed position, whereby a nonpositive connection for the purpose of generator operation to the electric machine 2 is produced.

Figure 4:
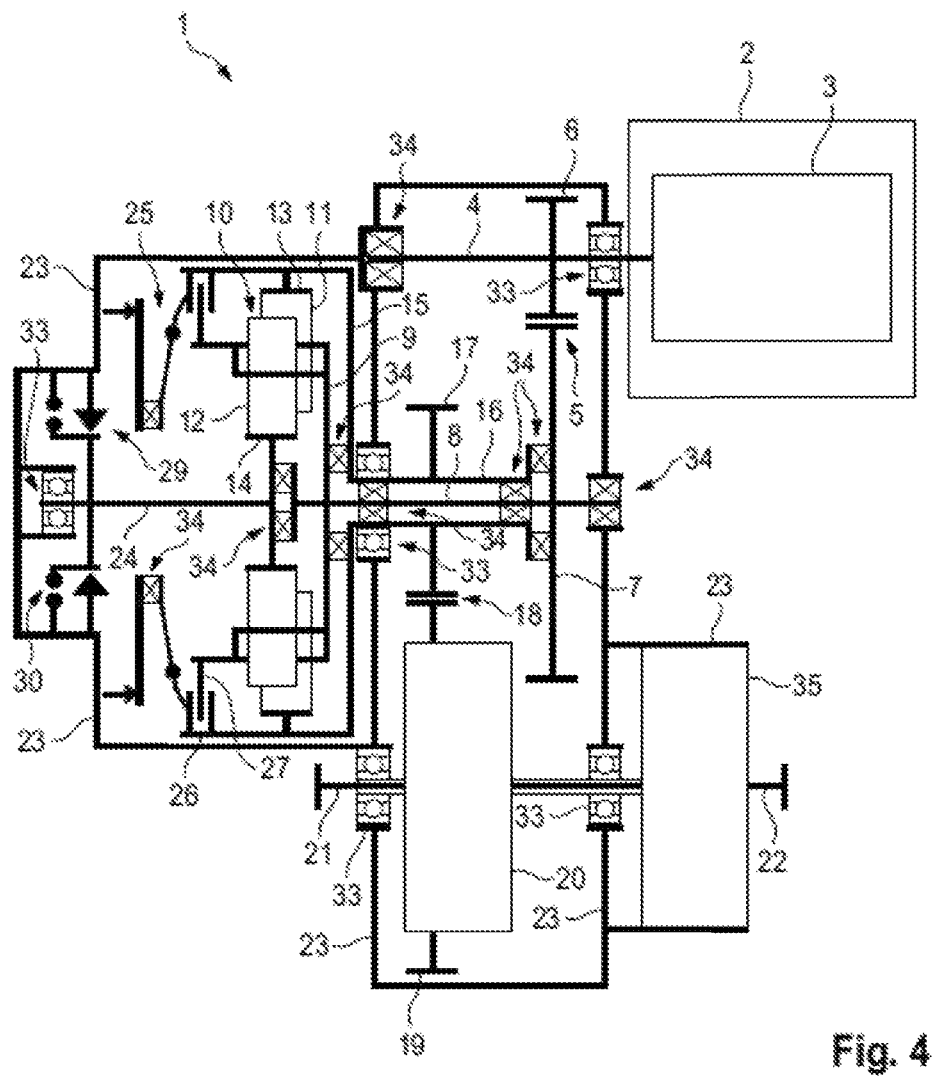
FIG. 4 shows, for a further preferred exemplary embodiment, a schematic illustration of the drive components of the electric axle drive.

FIG. 4 shows a further basic arrangement of the drive components of the electric axle drive, wherein this basic arrangement differs from that according to FIG. 3 only in that, instead of the torque-vectoring unit 31, a transverse lock 35 is provided which is electrically controllable and interacts with the differential gear mechanism. Thus, according to the representation in FIGS. 3 and 4, the differential can be connected to a torque-vectoring unit 31 or a transverse lock 35. Differential gear mechanism 20 and/or torque-vectoring unit 31 or transverse lock 35 can be arranged either individually or together in each case inside or outside the transmission housing 23.

FIG. 5 shows an exemplary representation of a transverse lock 35 connected to a differential gear mechanism 20. For the sake of simplicity, components corresponding with the configuration according to FIG. 4 are designated with the same reference numbers.

FIG. 5 illustrates a housing 36 of the differential gear mechanism 20 to which the spur gear 19 of the spur gear stage 18 is connected by means of a welded connection. Mounted in the housing 36 is an axle 37 which receives differential bevel gears 38 of the differential gear mechanism 20. These interact with toothed wheels 39, 40 which serve to receive the output shafts 21, 22 in a rotationally fixed manner. A multiplate clutch 41 is integrated into the housing 36. Inner plates 42 of the multiplate clutch 41 are mounted in a rotationally fixed manner in the toothed wheel 40 and outer plates 43 of the multiplate clutch 41 are mounted in a rotationally fixed manner in the housing 36. Furthermore, an actuator 28 with actuating drive 44 is mounted in the housing 36. The actuator 28 is electronically controllable, and, via the actuating drive 44, adjusts actuating elements for the multiplate clutch 41, with the result that said clutch can be closed completely with slip. In the case of the electromotor variant illustrated, this adjustment takes place via a ball ramp 32 which, under the action of the actuating drive 44, presses together the inner and outer plates 42, 43 of the multiplate clutch 41 to a greater or lesser extent.

The invention claimed is:

1. An electric axle drive for a motor vehicle, said electric axle drive comprising:
    a transmission housing;
    an electric machine for driving two output shafts of an axle of the motor vehicle;
    a first spur gear stage drivable by the electric machine;
    a second spur gear stage;
    a planetary gear mechanism drivable by the first spur gear stage and including an intermediate shaft, a planetary carrier, a ring gear, a sun gear, and two shifting elements, the planetary carrier fixedly connected to the intermediate shaft and receives planetary gears, the ring gear for driving the second spur gear stage, the sun gear and two shifting elements for shifting the ring gear and the sun gear;
    a differential gear mechanism connected in a torque-transmitting manner to an output of the second spur gear stage, the two output shafts being assigned to the output of said differential gear mechanism;
    wherein a first of the two shifting element is configured as a clutch for connecting the ring gear and the sun gear, the ring gear and the planetary gear carrier, or the sun gear and the planetary carrier in a torque-transmitting manner;
    wherein a second of the two shifting elements is configured for connecting the sun gear and the transmission housing in a rotationally fixed manner, and
    wherein the planetary gears comprise first planetary gears and second planetary gears mounted in the planetary carrier, the first planetary gears mesh only with the ring gear and the second planetary gears, and the second planetary gears mesh only with the sun gear and the first planetary gears.

2. The electric axle drive as claimed in claim 1, wherein the clutch is opened in a first shifting stage and closed in a second shifting stage, and the second shifting element effects immobilization of the sun gear with respect to the transmission housing in the first shifting stage and the immobilization is canceled in the second shifting stage.

3. The electric axle drive of claim 1, wherein the clutch interconnects the planetary carrier and the ring gear in a rotationally fixed manner in its closed position.

4. The electric axle drive of claim 1, wherein the clutch is frictionally active.

5. The electric axle drive of claim 1, wherein the second shifting element is configured as at least one of a freewheel, a clutch, a claw clutch, or a brake.

6. The electric axle drive of claim 5, wherein at least one of the second shifting element is configured as the clutch and, in the first shifting stage, the clutch is closed to immobilize the sun gear with respect to the transmission housing of the planetary gear mechanism or the second shifting element is configured as the freewheel and, in the first shifting stage, immobilizes the sun gear with respect to the transmission housing of the planetary gear mechanism.

7. The electric axle drive of claim 1, wherein at least one of the second shifting element is configured as a clutch and, in a second shifting stage, the clutch is opened to immobilize the sun gear with respect to the transmission housing of the planetary gear mechanism or the second shifting element is configured as a freewheel and, in the second shifting stage, releases the sun gear with respect to the housing.

8. The electric axle drive of claim 7, wherein the second shifting element is configured as the freewheel and is combined with a further clutch or a claw clutch for recuperation.

9. The electric axle drive of claim 1, wherein the second spur gear stage includes a first spur gear arranged co-axially to the intermediate shaft.

10. The electric axle drive of claim 9, wherein the planetary gear mechanism is arranged co-axially to the intermediate shaft, and the respective axes of the first and second spur gear stages and a center axis of at least one of the two output shaft are arranged axially parallel to one another.

11. The electric axle drive of claim 1, wherein the differential gear mechanism is configured as a bevel gear differential gear mechanism, a planetary differential gear mechanism, or a planetary differential gear mechanism with a Ravigneaux-type gear set.

12. The electric axle drive of claim 11, wherein the differential gear mechanism is connected to a torque vectoring unit or a transverse lock, and wherein the torque vectoring unit comprises at least one further electric machine and at least one superposition gear mechanism to generate a differential torque between the two output shafts.

13. The electric axle drive of claim 1, wherein the differential gear mechanism is connected to a torque vectoring unit or a transverse lock, and wherein at least one of the differential gear mechanism, the torque vectoring unit, or the transverse lock are arranged inside the transmission housing.

14. The electric axle drive of claim 1, wherein the differential gear mechanism is connected to a torque vectoring unit or a transverse lock, and wherein at least one of the differential gear mechanism, the torque vectoring unit, or the transverse lock are arranged outside the transmission housing.

15. An electric axle drive for a motor vehicle, said electric axle drive comprising:
    a transmission housing;
    an electric machine for driving two output shafts of an axle of the motor vehicle;
    a first spur gear stage drivable by the electric machine;
    a second spur gear stage;
    a planetary gear mechanism drivable by the first sour gear stage and including an intermediate shaft, a planetary carrier, a ring gear, a sun gear, and two shifting elements, the planetary carrier fixedly connected to the intermediate shaft and receives planetary gears, the ring gear for driving the second spur gear stage, the sun gear and two shifting elements for shifting the ring gear and the sun gear;
    a differential gear mechanism connected in a torque-transmitting manner to an output of the second sour gear stage, the two output shafts being assigned to the output of said differential gear mechanism;
    wherein a first of the two shifting element is configured as a clutch for connecting the ring gear and the sun gear, the ring gear and the planetary gear carrier, or the sun gear and the planetary carrier in a torque-transmitting manner;
    wherein a second of the two shifting elements is configured for connecting the sun gear and the transmission housing in a rotationally fixed manner,
    wherein the second shifting element is configured as a freewheel to provide for traction operation of the motor vehicle or as a clutch for over run operation of the motor vehicle.

16. The electric axle drive of claim 15, wherein at least one of the second shifting element is configured as the clutch and, in the first shifting stage, the clutch is closed to immobilize the sun gear with respect to the transmission housing of the planetary gear mechanism or the second shifting element is configured as the freewheel and, in the first shifting stage, immobilizes the sun gear with respect to the transmission housing of the planetary gear mechanism.

17. The electric axle drive of claim 16, wherein the second shifting element is configured as the freewheel and is combined with a further clutch or a claw clutch for recuperation.

* * * * *